United States Patent
Sheaffer et al.

(10) Patent No.: US 8,627,017 B2
(45) Date of Patent: Jan. 7, 2014

(54) READ AND WRITE MONITORING ATTRIBUTES IN TRANSACTIONAL MEMORY (TM) SYSTEMS

(75) Inventors: Gad Sheaffer, Haifa (IL); Shlomo Raikin, Geva Carmel (IL); Vadim Bassin, Raanana (IL); Raanan Sade, Kibutz Gvat (IL); Ehud Cohen, Kiryat Motskin (IL); Oleg Margulis, Haifa (IL)

(73) Assignee: Intel Corporation, Santa Clara, CA (US)

( * ) Notice: Subject to any disclaimer, the term of this patent is extended or adjusted under 35 U.S.C. 154(b) by 668 days.

(21) Appl. No.: 12/346,530

(22) Filed: Dec. 30, 2008

(65) Prior Publication Data

US 2010/0169579 A1    Jul. 1, 2010

(51) Int. Cl.
*G06F 12/08*    (2006.01)

(52) U.S. Cl.
USPC .................... 711/145; 711/141; 711/E12.002

(58) Field of Classification Search
USPC .......... 711/118, 141, 151, 152, 145, E12.002, 711/E12.026
See application file for complete search history.

(56) References Cited

U.S. PATENT DOCUMENTS

| | | | |
|---|---|---|---|
| 5,008,813 | A | 4/1991 | Crane et al. |
| 5,301,294 | A | 4/1994 | Kawai et al. |
| 6,272,602 | B1 | 8/2001 | Singhal et al. |
| 6,549,996 | B1 | 4/2003 | Manry, IV et al. |
| 2002/0087801 | A1 | 7/2002 | Bogin et al. |
| 2003/0005219 | A1 | 1/2003 | Royer, Jr. et al. |
| 2003/0014697 | A1 | 1/2003 | Hornung et al. |
| 2003/0131030 | A1* | 7/2003 | Sebot et al. .................... 708/209 |
| 2003/0204670 | A1 | 10/2003 | Holt et al. |
| 2003/0217234 | A1 | 11/2003 | Rowlands |
| 2004/0064651 | A1 | 4/2004 | Conway |
| 2004/0064813 | A1 | 4/2004 | Neiger et al. |
| 2004/0093467 | A1 | 5/2004 | Shen et al. |
| 2005/0060495 | A1 | 3/2005 | Pistoulet |
| 2005/0091459 | A1 | 4/2005 | Quach et al. |
| 2005/0160230 | A1 | 7/2005 | Doren et al. |
| 2005/0160232 | A1 | 7/2005 | Tierney et al. |
| 2005/0246487 | A1 | 11/2005 | Ergan |

(Continued)

FOREIGN PATENT DOCUMENTS

WO    2010/077850 A2    7/2010

OTHER PUBLICATIONS

International Search Report and Written Opinion received for PCT Application No. PCT/US2009/068004, mailed on Jun. 22, 2010, 12 pages.

(Continued)

*Primary Examiner* — Pierre-Michel Bataille
(74) *Attorney, Agent, or Firm* — Blakely, Sokoloff, Taylor & Zafman LLP

(57) ABSTRACT

A method and apparatus for monitoring memory accesses in hardware to support transactional execution is herein described. Attributes are monitor accesses to data items without regard for detection at physical storage structure granularity, but rather ensuring monitoring at least at data items granularity. As an example, attributes are added to state bits of a cache to enable new cache coherency states. Upon a monitored memory access to a data item, which may be selectively determined, coherency states associated with the data item are updated to a monitored state. As a result, invalidating requests to the data item are detected through combination of the request type and the monitored coherency state of the data item.

25 Claims, 5 Drawing Sheets

(56) References Cited

U.S. PATENT DOCUMENTS

| | | |
|---|---|---|
| 2006/0085611 A1 | 4/2006 | Ikeda et al. |
| 2006/0248259 A1 | 11/2006 | Ryu et al. |
| 2007/0061511 A1 | 3/2007 | Faber |
| 2007/0239942 A1 | 10/2007 | Rajwar et al. |
| 2007/0245309 A1 | 10/2007 | Gray et al. |
| 2008/0040551 A1 | 2/2008 | Gray et al. |
| 2008/0126647 A1* | 5/2008 | Cometto et al. ............. 710/200 |
| 2008/0209133 A1 | 8/2008 | Ozer et al. |
| 2008/0229070 A1* | 9/2008 | Charra et al. ................ 712/207 |
| 2008/0276304 A1* | 11/2008 | Maffione et al. .................. 726/4 |
| 2008/0307169 A1 | 12/2008 | Averill |
| 2008/0320254 A1* | 12/2008 | Wingard et al. ............. 711/157 |
| 2008/0320268 A1* | 12/2008 | Wingard et al. ............. 711/202 |
| 2009/0158006 A1 | 6/2009 | Nam |
| 2010/0122073 A1 | 5/2010 | Narayanaswamy et al. |
| 2010/0332716 A1 | 12/2010 | Sheaffer et al. |
| 2011/0302446 A1 | 12/2011 | Becker-Szendy et al. |

OTHER PUBLICATIONS

International Preliminary Report on Patentability received for PCT Application No. PCT/US2009/068004, Mailed on Jul. 14, 2011, 6 pages.

Office Action mailed May 25, 2012, Chinese Patent Application No. 200911000282.0, 7 pages.

Bruce Jacob et al., Memory Systems: Cache, DRAM, Disk. Sep. 2007, Morgan Kaufmann, 7 pages.

J. Eliot, B. Moss, and Antony L Hosking, "Nested Transactional Memory: Model and Preliminary Architecture Sketches," Oct. 2005, ACM. SCOOL '05, 10 pages.

* cited by examiner

READ AND WRITE MONITORING ATTRIBUTES IN TRANSACTIONAL MEMORY (TM) SYSTEMS

FIELD

This invention relates to the field of processor execution and, in particular, to execution of groups of instructions.

CROSS REFERENCE TO RELATED APPLICATIONS

This application is related to the following patent applications filed herewith: U.S. patent application Ser. No. 12/346,543, entitled "Extending Cache Coherency Protocols to Support Locally Buffered Data," by Gad Sheaffer et al., filed on Dec. 30, 2008; U.S. patent application Ser. No. 12/346,539, entitled "Memory Model for Hardware Attributes Within a Transactional Memory System," by Gad Sheaffer et al., filed on Dec. 30, 2008 U.S. patent application Ser. No. 12/346,518, entitled "Registering a User-Handler in Hardware for Transactional Memory Event Handling," by Gad Sheaffer et al., filed on Dec. 30, 2008; U.S. patent application Ser. No. 12/346,500, entitled "Metaphysical Address Space for Holding Lossy Meta-data in Hardware," by Gad Sheaffer et al., filed on Dec. 30, 2008.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. Either way, after extrapolating this simple example into a large scalable program, it is apparent that the complexity of lock contention, serialization, fine-grain synchronization, and deadlock avoidance become extremely cumbersome burdens for programmers.

Another recent data synchronization technique includes the use of transactional memory (TM). Often transactional execution includes executing a grouping of a plurality of micro-operations, operations, or instructions. In the example above, both threads execute within the hash table, and their memory accesses are monitored/tracked. If both threads access/alter the same entry, conflict resolution may be performed to ensure data validity. One type of transactional execution includes Software Transactional Memory (STM), where tracking of memory accesses, conflict resolution, abort tasks, and other transactional tasks are performed in software, often without the support of hardware.

In strongly atomic Software Transactional Memory (STM) systems, to ensure runtime conflicts between transactional memory operations and non-transactional memory operations do not occur, compilers treat each non-transactional memory operation as a single operation transaction. In other words, transactional barriers are inserted at transactional memory accesses and at non-transactional memory accesses to isolate transactions from each other and non-transactional memory accesses. However, execution of transactional barriers at every transactional and non-transactional memory operation is potentially expensive and complex.

Another type of transactional execution includes a Hardware Transactional Memory (HTM) System, where hardware is included to support access tracking, conflict resolution, and other transactional tasks. However, previous attempts at hardware support for transactional execution have not effectively integrated software transactional advantages, such as access tracking and conflict detection on any data granularity level, into hardware.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware structures for transactional execution, specific types and implementations of access monitors, specific cache implementations, specific types cache coherency models, specific data granularities, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific and alternative multi-core and multi-threaded processor architectures, specific compiler methods/implementations, and specific operational details of microprocessors, have not been described in detail in order to avoid unnecessarily obscuring the present invention.

The method and apparatus described herein are for providing memory access monitors to support transactional execution. Specifically, providing memory access monitors is primarily discussed in reference to monitors associated with cache memory structures to track accesses to memory addresses. In fact, specific reference is made to monitors associated with a cache memory in FIGS. 2 and 4 below. However, the methods and apparatus for providing memory access monitors is not so limited, as they may be implemented in conjunction with any structure to track memory accesses to data elements.

Figure 1:
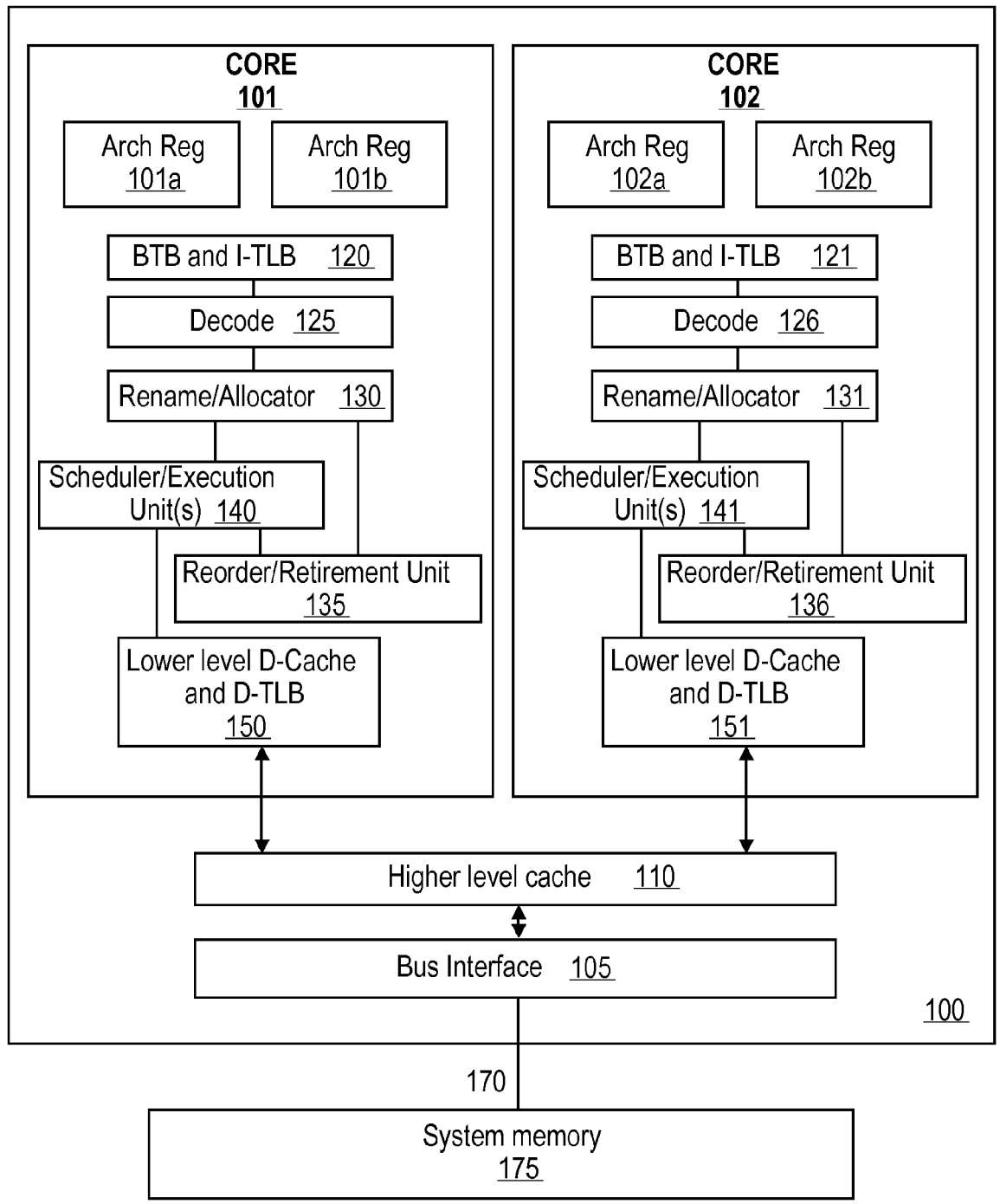
FIG. 1 illustrates an embodiment of a processor including multiple processing elements capable of executing multiple software threads concurrently.

Referring to FIG. 1, an embodiment of a processor capable of executing multiple threads concurrently is illustrated. Note, processor 100 may include hardware support for hardware transactional execution. Either in conjunction with hardware transactional execution, or separately, processor 100 may also provide hardware support for hardware acceleration of a Software Transactional Memory (STM), separate execution of a STM, or a combination thereof, such as a hybrid Transactional Memory (TM) system. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102, which share access to higher level cache 110. Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocator logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative functional units/resources of a processor is illustrated. Note that a processor may include, or omit, any of these functional units, as well as include any other known functional units, logic, or firmware not depicted.

As illustrated, processor 100 includes bus interface module 105 to communicate with devices external to processor 100, such as system memory 175, a chipset, a northbridge, or other integrated circuit. Memory 175 may be dedicated to processor 100 or shared with other devices in a system. Higher-level or further-out cache 110 is to cache recently fetched elements from higher-level cache 110. Note that higher-level or further-out refers to cache levels increasing or getting further way from the execution unit(s). In one embodiment, higher-level cache 110 is a second-level data cache. However, higher level cache 110 is not so limited, as it may be associated with or include an instruction cache. A trace cache, i.e. a type of instruction cache, may instead be coupled after decoder 125 to store recently decoded traces. Module 120 also potentially includes a branch target buffer to predict branches to be executed/taken and an instruction-translation buffer (I-TLB) to store address translation entries for instructions.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

In one embodiment, processor 100 is capable of transactional execution. A transaction, which may also be referred to as a critical or atomic section of code, includes a grouping of instructions, operations, or micro-operations to be executed as an atomic group. For example, instructions or operations may be used to demarcate a transaction or a critical section. In one embodiment, described in more detail below, these instructions are part of a set of instructions, such as an Instruction Set Architecture (ISA), which are recognizable by hardware of processor 100, such as decoders described above. Often, these instructions, once compiled from a high-level language to hardware recognizable assembly language include operation codes (opcodes), or other portions of the instructions, that decoders recognize during a decode stage.

Typically, during execution of a transaction, updates to memory are not made globally visible until the transaction is committed. As an example, a transactional write to a location is potentially visible to a local thread, yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if not conflicts have been detected for the transaction, then the transaction is committed and updates made during the transaction are made globally visible.

However, if the transaction is invalidated during its pendency, the transaction is aborted and potentially restarted without making the updates globally visible. As a result, pendency of a transaction, as used herein, refers to a transaction that has begun execution and has not been committed or aborted, i.e. pending. Example implementations for transactional execution include a Hardware Transactional Memory (HTM) system, a Software Transactional Memory (STM) system, and a combination or hybrid thereof.

A Software Transactional Memory (STM) system often refers to performing access tracking, conflict resolution, or other transactional memory tasks in or at least partially in software. In one embodiment, processor 100 is capable of executing a compiler to compile program code to support transactional execution. Here, the compiler may insert operations, calls, functions, and other code to enable execution of transactions.

A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts transactional operations, calls, functions, etc. in one or more phases of compilation, such as insertion of calls/operations in a front-end phase of compilation and then transformation of the calls/operations into lower-level code during a transactional memory transformation phase.

Nevertheless, despite the execution environment and dynamic or static nature of a compiler, the compiler, in one embodiment, compiles program code to enable transactional execution. Therefore, reference to execution of program code, in one embodiment, refers to (1) execution of a compiler program(s), either dynamically or statically, to compile main program code, to maintain transactional structures, or to perform other transaction related operations, (2) execution of main program code including transactional operations/calls, (3) execution of other program code, such as libraries, associated with the main program code, or (4) a combination thereof.

In one embodiment, processor 100 is capable of executing transactions utilizing hardware/logic, i.e. within a Hardware Transactional Memory (HTM) system. Numerous specific implementation details exist both from an architectural and microarchitectural perspective when implementing an HTM; most of which are not discussed herein to avoid unnecessarily obscuring the invention. However, some structures and implementations are disclosed for illustrative purposes. Yet, it should be noted that these structures and implementations are not required and may be augmented and/or replaced with other structures having different implementation details.

As an example of an implementation design choice, an HTM may operate in an update-in-place manner or a write-buffering manner. In an update-in place HTM, transactional writes are performed to referenced memory addresses to modify previous data held therein. However, this modified data is not provided to external requesting threads, i.e. the data is not made globally visible, but is provided to local reads for local memory ordering purposes. Additionally, the previous data is often "logged," such that upon an abort of the transaction, the previous data is capable of being restored to achieve the state of the thread before execution of the transaction begun.

To illustrate, assume data cache 150 includes a first level data cache to hold data from higher level memory, such as cache 110 and system memory 175. Therefore, upon encountering a transactional write to data cache 150, the previous data item, in one embodiment of a write-back cache, writes the previous data item back to higher level cache 110. Alternatively, the previous data may be logged in another separate memory within processor 100 or external thereto. After logging the previous data item, the transactional write is performed to update the data item in cache 150. Therefore, a local thread, such as local thread 101a, i.e. a thread that is associated with the transactional write, may read from the modified data item in cache 150. However, another thread, such as thread 102b, is not provided the modified data, but rather the logged data, in response to a read request, if the transaction including the transactional write having not yet committed. When the transaction commits, the logged data is invalidated or disregarded. Yet, if the transaction aborts, the previous data is reloaded or globally identified as the valid data.

In contrast, in a write-buffering HTM, transactional writes are buffered in a write buffer, while previous data resides in its original location. If a local thread, such as thread 102b, performs a read of the data transactionally written, then the modified data is forwarded from the write buffer. As a corollary, if an external thread requests a read of the data while the transaction including the transactional write is still pending, the previous data from the original location is provided. Furthermore, upon a commit of the transaction, the modified data is copied to the corresponding memory address, while upon an abort, the buffered data is disregarded.

As can be seen from the discussion above, accesses and requests may be made to data items both by local processing elements, as well as potentially by other processing elements. Without safety mechanisms, some of these accesses would potentially result in invalid data and execution, i.e. a write to data invalidating a read, or a read of invalid data. As a result, processor 100 potentially includes logic to track or monitor memory accesses for identification of potential conflicts.

In one embodiment, processor 100 includes read and write monitors to monitor and/or track memory accesses. As a first example, the monitors are to monitor memory accesses to a data element at a granularity of the data element without regard to being limited to the granularity of physical memory structures/locations to hold the data element. A data item or data element may include data at any granularity level, as defined by hardware, software or a combination thereof.

A non-exhaustive list of examples of data, data elements, data items, or references thereto, include a memory address, a data object, a class, a field of a type of dynamic language code, a type of dynamic language code, a variable, an operand, a data structure, and an indirect reference to a memory address. However, any known grouping of data may be referred to as a data element or data item. A few of the examples above, such as a field of a type of dynamic language code and a type of dynamic language code refer to data structures of dynamic language code. To illustrate, dynamic language code, such as Java™ from Sun Microsystems, Inc, is a strongly typed language. Each variable has a type that is known at compile time. The types are divided in two categories—primitive types (boolean and numeric, e.g., int, float) and reference types (classes, interfaces and arrays). The values of reference types are references to objects. In Java™, an object, which consists of fields, may be a class instance or an array. Given object a of class A it is customary to use the notation A::x to refer to the field x of type A and a·x to the field x of object a of class A. For example, an expression may be couched as a·x=a·y+a·z. Here, field y and field z are loaded to be added and the result is to be written to field x.

Therefore, monitoring memory accesses to data items may be performed at any of data level granularity. For example, in one embodiment, memory accesses to data are monitored at a type level. Here, a transactional write to a field A::x and a non-transactional load of field A::y may be monitored as accesses to the same data item, i.e. type A. In another embodiment, memory access monitoring is performed at a field level granularity. Here, a transactional write to A::x and a non-transactional load of A::y are not monitored as accesses to the same data item, as they are references to separate fields. Note, other data structures or programming techniques may be taken into account in tracking memory accesses to data items. As an example, assume that fields x and y of object of class A, i.e. A::x and A::y, point to objects of class B, are initialized to newly allocated objects, and are never written to after initialization. In one embodiment, a transactional write to a field B::z of an object pointed to by A::x are not monitored as memory access to the same data item in regards to a non-transactional load of field B::z of an object pointed to by A::y. Extrapolating from these examples, it is possible to determine that monitors may perform monitoring at any data granularity level.

In one embodiment, monitors include read monitors and write monitors to track loads and stores, which are determined to be monitored, accordingly. As an example, hardware read monitors and write monitors are to perform bounded monitoring of data items at least at a granularity of the data items despite the granularity of storage structures to hold the data items. In one embodiment, a read monitor for a data item includes a first number of read attributes to be associated with the data item. Similarly, a write monitor for a data item includes a second number of write attributes to be associated with the data item. Note that the first number of read attributes and the second number of write attributes may be the same; however, they are not so limited, and potentially include different numbers of attributes.

Read or write attributes include any logic, firmware, or structure for holding states or information associated with data items. For example, attributes for a data item include a bit vector, where each bit in the bit vector represents an attribute of a data item, such as transactionally loaded, transactionally written, non-transactionally loaded, non-transactionally written, not transactionally loaded, not transactionally written, not non-transactionally loaded, not non-transactionally written, access conflict detected, no access conflict detected, a read request, no read request, a write request, no write request, an ownership request, no ownership request, or any other attribute or state associated with a data item or memory location to hold the data item.

As another example, the attributes for a data item includes an encoded value. For example, states, such as the four states: (1) transactionally written; (2) transactionally read; (3) not transactionally written; and (4) not transactionally read, are encoded utilizing two attribute bits, i.e. four binary values of 00, 01, 11, and 10. Note these four states may include an example of a monitored write state, a monitored read state, a not monitored written state, and a not monitored read state.

As referred to above, read and write attributes may be associated with data items/elements in any known manner. For example, general storage within processor 100 may be utilized to hold read and write attributes corresponding to data items read and written that are to monitored, accordingly. The amount of ways to associate attributes with data items are too numerous to elaborate all of the methods.

Yet, as a first example, attributes are associated with a subset of bytes of a cache line. For example, assume a cache line of cache 150 is 64 bytes in length and is accessible by processor 100 in 8 byte segments. Here, attributes may be associated with any physical granularity of storage, such as 2, 4, 8, 16, 32, 64, or 128 bytes of data as illustrative examples, and may vary amongst cache 150, such as being associated with each 4 bytes of physical storage for one portion of cache 150 and each 8 bytes for another portion of cache 150.

Yet, in one embodiment, regardless of or despite the boundaries of physical storage, monitors/attributes are to perform bounded monitoring of a data item at the data item's granularity level despite a granularity of the physical storage in processor 100, i.e. one or both of cache 150 and attribute storage. For example, assume cache 150 includes 16 byte lines accessible in 4 byte segments, i.e. four accessible segments within each cache line. Furthermore, assume read and write attributes are associated with each 8 byte segment of each 16 byte line. Therefore, the cache is capable of reading and writing every 4 bytes of data, while attributes are capable of monitoring every 8 bytes of data.

To further the example, a monitored load results in a load of a data item having a size of 20 bytes spanning a portion of two cache lines of cache 150, i.e. all 16 bytes of a first line and the first 4 bytes of a second line. Therefore, the read attributes associated with the 16 bytes of the first cache line of cache 150 are updated to indicate the monitored load occurred. Furthermore, the read attributes associated with the first 8 bytes of the second cache line of cache 150 are also similarly updated, even though, the data item only occupies 4 bytes of the second cache line. Essentially, monitoring for the data item, in this embodiment, is provided at least at the granularity level of the data item, and potentially at a larger granularity to ensure the full data item is monitored, i.e. bounded monitoring. In other words, here, attributes bound monitoring of the data item without regard to physical storage granularity limitations or attribute association by ensuring the data item is monitored even if a greater amount of data is included due to the granularity of the physical storage. Inversely, if attributes provide a smaller granularity as compared to cache 150, then tracking a data item based on the attribute association is potentially more accurate than at the accessibility granularity of cache 150.

The example above assumed static association of attributes/monitors to a predetermined size, such as monitors for every 8 bytes of a 16 byte cache line. Note these associations are purely illustrative and may vary drastically, such as including smaller or greater monitor association granularity. However, in another embodiment, attributes are dynamically assigned from a pool of attributes upon a load or store of a data item. To illustrate, the example above is reexamined in this context. Here, when the 20 byte data item is loaded utilizing a monitored load, then read attributes are dynamically associated at that time with the 20 bytes of cache 150 that the data item is loaded from. Here, monitoring of the data item is truly decoupled from the granularity of a physical storage structure. In both instances, data is bounded by the monitors despite the granularity of the underlying storage structure, i.e. cache 150. However, in the first example the static granularity of the association of monitors with portions of cache 150 have to be taken into account to ensure data is bounded by correct monitoring. However, in the second example, monitors are dynamically associated at a specific granularity of the data item.

In one embodiment, monitors within processor 100, in a first mode, are to monitor all memory accesses. For example, when a transaction is being executed, all of the transactional memory accesses are monitored. Furthermore, in another mode, processor 100 is potentially capable of selectively monitoring memory accesses. Selective monitoring of memory accesses is discussed in more detail below in reference to FIG. 3.

In one embodiment, hardware monitors to monitor memory access operations are utilized for conflict detection, such as detection of invalidating memory accesses that may require an abort of a transaction. Regardless of how the association of hardware monitors or attributes are implemented, as discussed in more detail herein, access states of monitors may be utilized by conflict detection logic, firmware, software, or a combination thereof, to detect potential memory access conflicts. To illustrate, assume a read hardware monitor associated with a data item held in cache 150 indicates the data item has been previously loaded by a transaction, and subsequently, a request by another thread to write the data item is received by cache control logic for cache 150. Based on the write request and the current state of the read monitor, i.e. transactionally loaded, the conflict logic, which in one embodiment is included with or coupled to the cache control logic, detects the potential conflict. In response to the potential conflict, any number of actions may be taken in hardware, software, or a combination thereof. An example, discussed in more detail in reference to FIG. 2, includes setting a bit in a status register or setting a flag in response to the conflict, and transferring control to a handler to handle the potential conflict responsive to setting the bit or the flag.

Therefore, as inferred in the above example, in one embodiment, where attributes are associated with a cache memory, such as data cache 150, then existing known coherency and communication/snoop protocols may be utilized in combination with hardware monitors/attributes to detect conflicts. Here, based on the design, different combinations of cache coherency requests and states of monitors/attributes result in a potential conflict, such as the read monitor above indicating a monitored load of a data item and a snoop indicating a write request to the data item. Inversely, a write monitor indicating a monitored write to a data item and a snoop indicating a read request to the data item may be considered potentially conflicting. In one embodiment, to detect such combinations of access requests and attribute states snoop logic is coupled to conflict detection/reporting logic, such as monitors and/or logic for conflict detection/reporting.

Yet, detecting conflicts, in one embodiment, is not limited to utilizing common coherence protocols. Take for example, the architecture of processor 100 illustrated in FIG. 1. Here, separate physical threads share access to both data cache 150 and higher level cache 110. Therefore, if monitors are associated with cache 150, which is a shared cache to be shared between threads 101a and 101b, then potential conflicts between threads 101a and 101b may not be adequately detected due to the lack of interconnect requests being generated with cache 150 in response to accesses from threads 101a and 101b.

Consequently, monitors/attributes, in one embodiment, are replicated on a per processing element basis. In this example, attributes may be replicated per thread, i.e. the same attributes replicated for thread 101a and 101b. Note attribute replication potentially includes association of a single grouping of attributes with different thread identifiers to indicate which thread is associated with the state of the single grouping of attributes. In contrast, replication may include a number of individual groups of replicated attributes, each of which are associated with a thread. As an example, one set of attributes for a data item are associated with thread 101a and a second set of attributes for the data item are associated with thread 101b.

As a result, to detect conflicts between threads 101a and 101b sharing access to a cache 150 includes access tracking on a per processing element, such as a per thread basis. To illustrate, assume thread 101a sets a monitor associated with a data item D. Here, the replicated attributes associated with thread 101a are set to an appropriate monitored value. Therefore, if thread 101b makes a conflicting request to data item D, then a conflict is detected. In one embodiment, reporting logic coupled to the control logic to detect the conflict reports the conflict for appropriate handling. As an example, a logical operation, such as a logical OR, combines different conflict events, such as a loss of monitoring due to external reasons (eviction or external snoop) and due to shared cache thread access conflicts.

In one embodiment, attributes associated with data items held in cache 150 are implemented utilizing ephemeral or private stores. Here, attributes may be held anywhere in cache 150, such as in lines of cache 150 themselves. For example, one example of an HTM described above, includes an update-in-place HTM. Here, transactional modified data is held in current memory locations, while the previous data is logged/backed up, such as in a higher-level memory. As a result, in one embodiment, when cache 150 is accessed with regard to a data item, the attributes are ephemerally stored with the data item in cache 150. Here, the data item is held in a private or ephemeral coherency state, which allows cache control logic to ensure transactional semantics are upheld. In other words, a data item held in an ephemeral state is not provided to other threads.

However, if the data item is evicted from cache 150, then the privately held attributes are potentially lost. Essentially, the attributes are system created to monitor the data item, and are not written back to higher level memory. In a scenario where attributes are to decay, i.e. lost upon an eviction or other event, a potential conflict may be triggered in a similar manner to detecting a potential access conflict, as described above. A version of ephemeral stores and private states, such as buffered stores and a buffered state, is discussed in a related application filed herewith having attorney docket number P29132 entitled, "Extending the MESI protocol to support locally buffered data."

As illustrated by the examples discussed above, hardware attributes, which are associated with data items in a cache, may be held outside a cache, within cache logic, within arrays of a cache, within other structures of a cache, or even ephemerally within data portions of a cache. Often, these hardware attributes are maintained by hardware without direct manipulation by execution of user-instructions. For example, a software program includes a transactional write to a data item. When the processor encounters the transactional write and determines it is to be monitored, the hardware updates the write attributes associated with the data item, appropriately. For example, an ephemeral store is inserted and executed to update cache 150 with the data item and associated write attributes. As another example, attributes are appended to coherency state bits of cache 150 and the coherency state of lines of cache 150 to hold the data item are updated in response to the transactional write.

Yet, in one embodiment, in addition to hardware management of hardware monitors/attributes, instructions are also recognizable by the hardware to directly manipulate the attributes. As an example, these instructions or operations are part of an Instruction Set Architecture (ISA) recognizable by processor 100 to perform operations on the attributes. For example, the ISA includes opcodes, when detected by decoders of processor 100, to modify the attributes, accordingly. Examples of instructions that may be utilized includes, a set instruction to set attributes associated with a data item to a state, a reset instruction to reset attributes associated with a data item to a default state, a test or read instruction to read a state of attributes, and a clear instruction to clear all attributes for a transaction or within a cache.

One of the aforementioned examples included a clear instruction to clear attributes. In one embodiment, a bulk clear instruction is utilized to clear a bulk of read and write monitors. Note a bulk clear instruction is potentially useful in a number of scenarios. First, upon a commit or abort of a transaction, read and write monitors for the transaction are potentially cleared/reset. Second, a transition of processor 100 from one domain to another may be configurable to clear/reset read and write monitors. Examples of domains in Intel's IA 32 architecture include a read domain, a big real domain, and a virtual domain. Third, upon an exception or interrupt it may be useful to clear read and write monitors. Consequently, when the clear instruction is encountered, either a monitor, a range of monitors, all monitors meeting a specified condition, or all monitors within a cache are cleared.

As state above in the initial reference to FIG. 1, the architecture of processor 100 is purely illustrative for purpose of discussion. Similarly, the specific examples of associating attributes with data items/elements is also exemplary, as any method of associating hardware monitors/attributes at different granularity data items may be utilized. An example of associating attributes with data items in a cache is further discussed in reference to FIG. 2.

Figure 2:
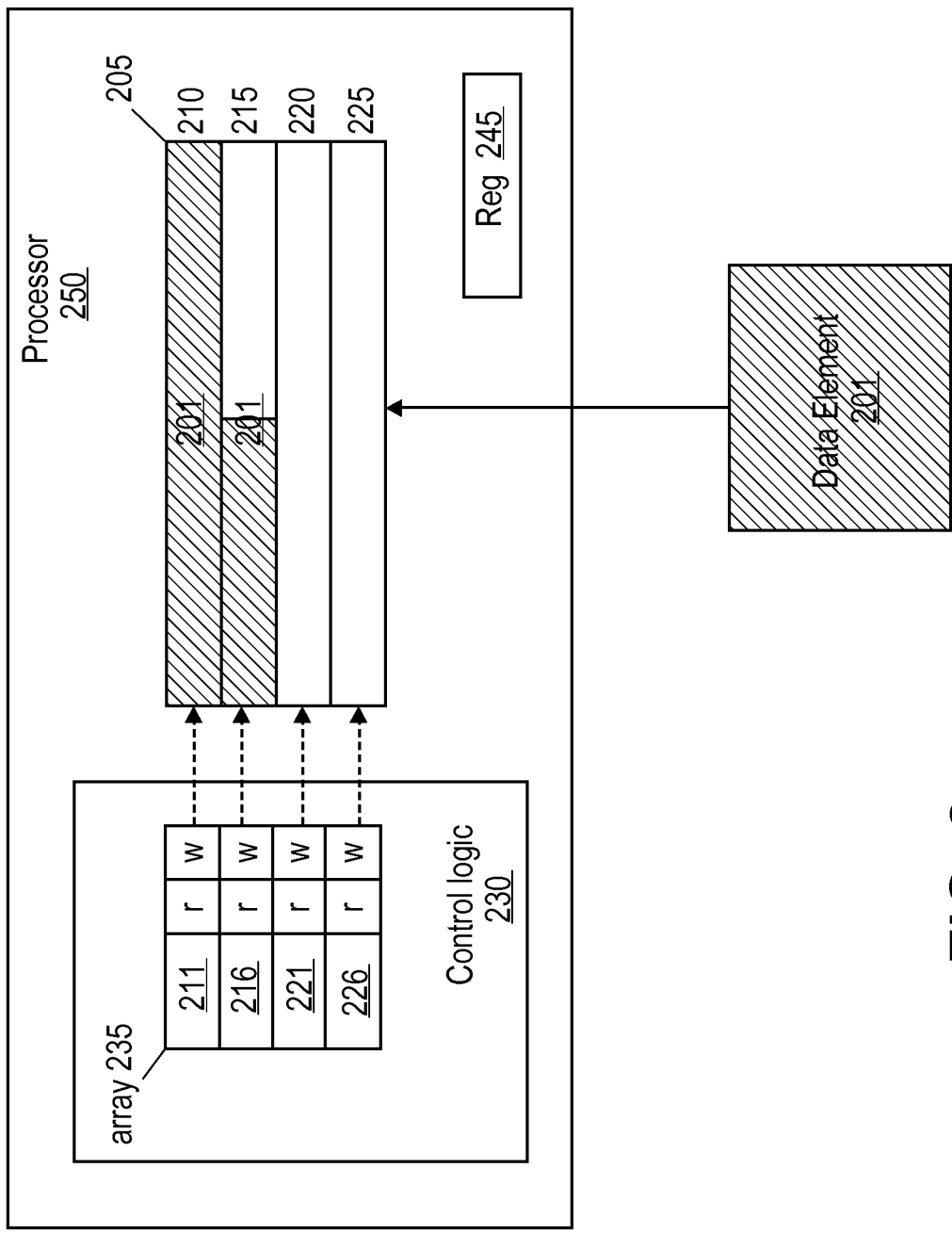
FIG. 2 illustrates an embodiment of structures in a processor to support transactional execution.

Referring to FIG. 2, an embodiment of associating attributes with a data item in cache memory is illustrated. Processor 250 includes any type of known processor with any number of processing elements capable of transactional execution. As discussed above, attributes may be statically associated with any physical size of a physical storage structure, or dynamically assigned to data items. The embodiment of FIG. 2 illustrates attributes, i.e. attributes 211.*r*-226.*r* and 211.*w*-226.*w*, associated with a static portion of cache 205, i.e. portions 210-225, respectively. For example, portions 210-225 are cache lines of cache 250. Cache 250 includes any cache associated with a processor, such as a first level cache or a second level cache.

As illustrated, read attribute 211.*r* is associated with cache line 210 and write attribute 211.*w* is associated with cache line 210. Array 235, in one embodiment, includes a tag array with attributes 211.*r* and 211.*w*. In another embodiment, array 235 includes a state array, such as a coherency state array, with attributes 211.*r* and 211.*w* being included within the state bits to essentially create new coherency states for cache 205. An example of utilizing coherency states is described in more detail below in reference to FIG. 4. In yet another embodiment, array 235 includes any array within cache control logic 230, as illustrated, or any other structure of attributes outside control logic and within processor 250, which is not depicted.

In one embodiment, attributes 211.*r*-226.*r* and 211.*w*-226.*w*, monitor memory accesses to data items/elements, such as data element 201, despite physical boundaries of storage structures, such as boundaries of cache lines within cache 205. In fact, data items may be unaligned with boundaries, such as cache lines, of cache 205. Here, monitoring the data item despite physical boundaries of cache 205 includes bounding the unaligned data item with monitoring based on association of monitoring attributes with portions of cache 205. Here, attributes are associated on a per line basis; therefore, any lines containing a monitored data item are monitored even if they hold other data to ensure the data item is properly monitored.

Numerous examples of different data items are discussed above. In FIG. 2, data item 201 is depicted as the size of 1½ cache lines. As an illustrative example, assume a transactional load operation is executed to load from a memory address referencing data element 201, which results in a load of data element 201 into cache lines 210 and 215. Processor 250, either by mode or set of conditions, determines the transactional load is to be monitored.

As a result, control logic 230 determines data item 201 is to be bounded, i.e. at least the data item is monitored and potentially more data than necessary is monitored to ensure correct conflict detection. Here, control logic 230 updates fields 211*r* and 216*r* to indicate a monitored load from cache lines 215 and 216 has occurred. As a first example, fields 211*r* and 216*r* are updated to a monitored logical value, such as a logical one, from an unmonitored logical value, such as a logical zero. In the embodiment where array 235 is a coherency state array, fields 211 and 216 are transitioned to appropriate coherency states, such as a monitored read shared coherency state, as described below. Therefore, as an example, when snoop logic in control logic 230 detects a request to write to either cache line 210 or 205, then a potential conflict is detected.

Although FIG. 2 primarily focuses on attributes being separate from data portion 205 of a cache, as mentioned above, attributes may be held within data portion 205. Utilizing the example immediately above, instead of updating attributes 211r and 216r in response to the monitored load the attributes are privately stored in cache line 210, 215, or both. The state of cache lines 210 and 215 are transitioned to a buffered or private state. Therefore, upon the write request, a similar conflict is detected utilizing the private held attribute information. However, upon an eviction of lines 210 or 215, the attribute information potentially decays, i.e. is lost. As a result, a similar conflict process may be triggered. Note also that discussion in reference to FIG. 2 includes only one set of attributes per cache line. However, attributes may be replicated per thread of processor 250, as stated above in reference to cache 150 of FIG. 1. As an example, attributes are replicated per thread that shares cache 205. In addition, different numbers of read and write attributes may be provided instead of the even number of read and write attributes illustrated.

In one embodiment, conflict logic, which may be included within cache control logic 230 or associated therewith, is to detect conflicts associated with the attributes. Based on design implementation, any combination of attribute states, requests, communication protocols, or coherency protocols may be utilized to determine a conflict exists. As oversimplified basic examples, a write to a monitored read is potentially a conflict and a read or a write of a monitored write is potentially a conflict.

Once a conflict is detected, in one embodiment, reporting logic reports the conflict. The conflict may be handled by hardware, firmware, software, or a combination thereof. In one embodiment, reporting logic includes a storage element, such as register 245. The storage element may include any structure(s) within processor 250 for holding information, such as a memory, generic register, or model specific register (MSR). As a first example, register 245 includes a status register. In response to detecting a conflict a value may be set in register 245 to a conflict value to indicate a conflict has occurred. Here, software may poll register 245 to see if the value was set to a conflict value. As another example, processor 250 includes a flags register to include a flag, such as an overflow flag, which is to be tested by an instruction, such as a jump instruction. To illustrate, a conditional jump instruction following a load instruction is capable of being utilized to test consistency of the read set of a transaction.

As referred to above, loss of attribute data, due to an eviction or other event, is also considered a conflict. Here, register 245 may be utilized in a similar manner to indicate loss of attribute data. In one embodiment, in response to loss of attribute data, reporting logic redirects operation of processor 250 to a software handler to accommodate the limited storage capacity for monitoring attributes. An example of virtualizing transactional memory in response to an overflow event is discussed in co-pending application with Ser. No. 11/479,902 entitled, "Global Overflow Method for Virtualized Transactional Memory." In addition an example of utilizing a storage element, such as register 245, to register a user handler to handle transactional events, such as conflicts, is discussed in an application filed having Ser. No. 12/346,518, entitled "Registering a User-Handler in Hardware for Transactional Memory Event Handling," by Gad Sheaffer et al., filed on Dec. 30, 2008.

Register 245, in one embodiment, is to hold a value to indicate an operating mode of processor 250, such as non-monitoring mode, a non-selective monitoring mode, and a selective monitoring mode. Within a selective monitoring mode, register 245, or other registers, may also define selection criteria for monitoring an access. Note that discussion of register 245 in regards to use as a status register, a register to register a user handler, a register to define an operating mode, and a register to define selection criteria may refer to a single register or a combination of registers to implement any combination of the aforementioned potential uses of storage element 245.

Figure 3:
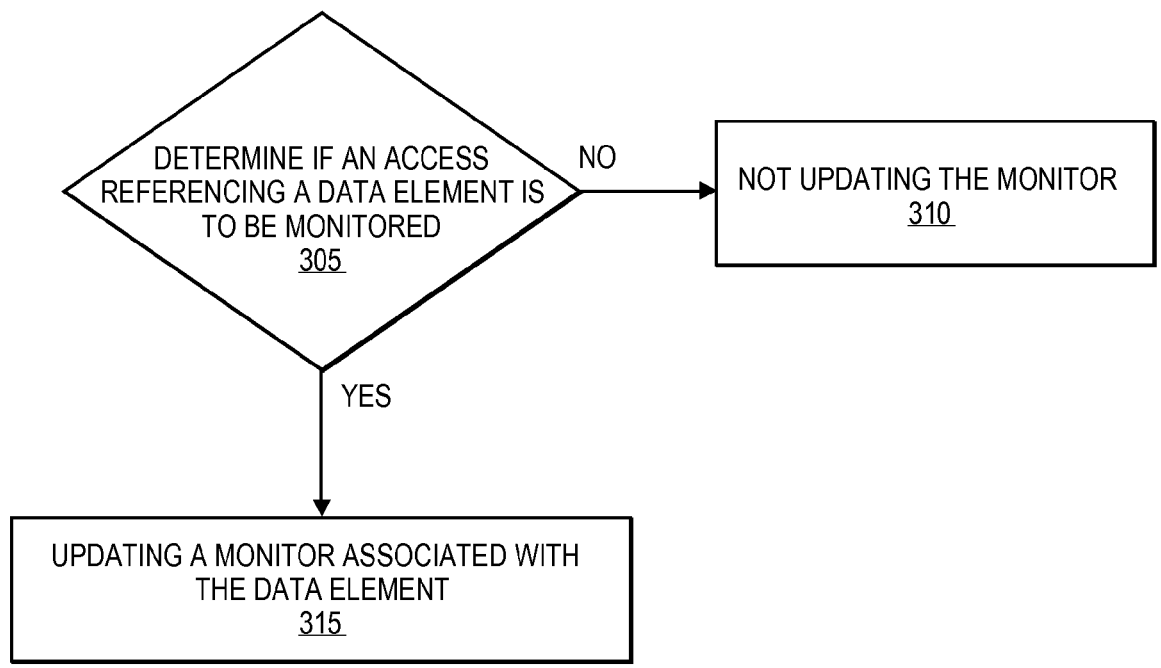
FIG. 3 illustrates an embodiment of a flowchart for a method of operating in a selective association mode for memory access monitoring or a non-selective association mode for memory access monitoring.
Figure 5:
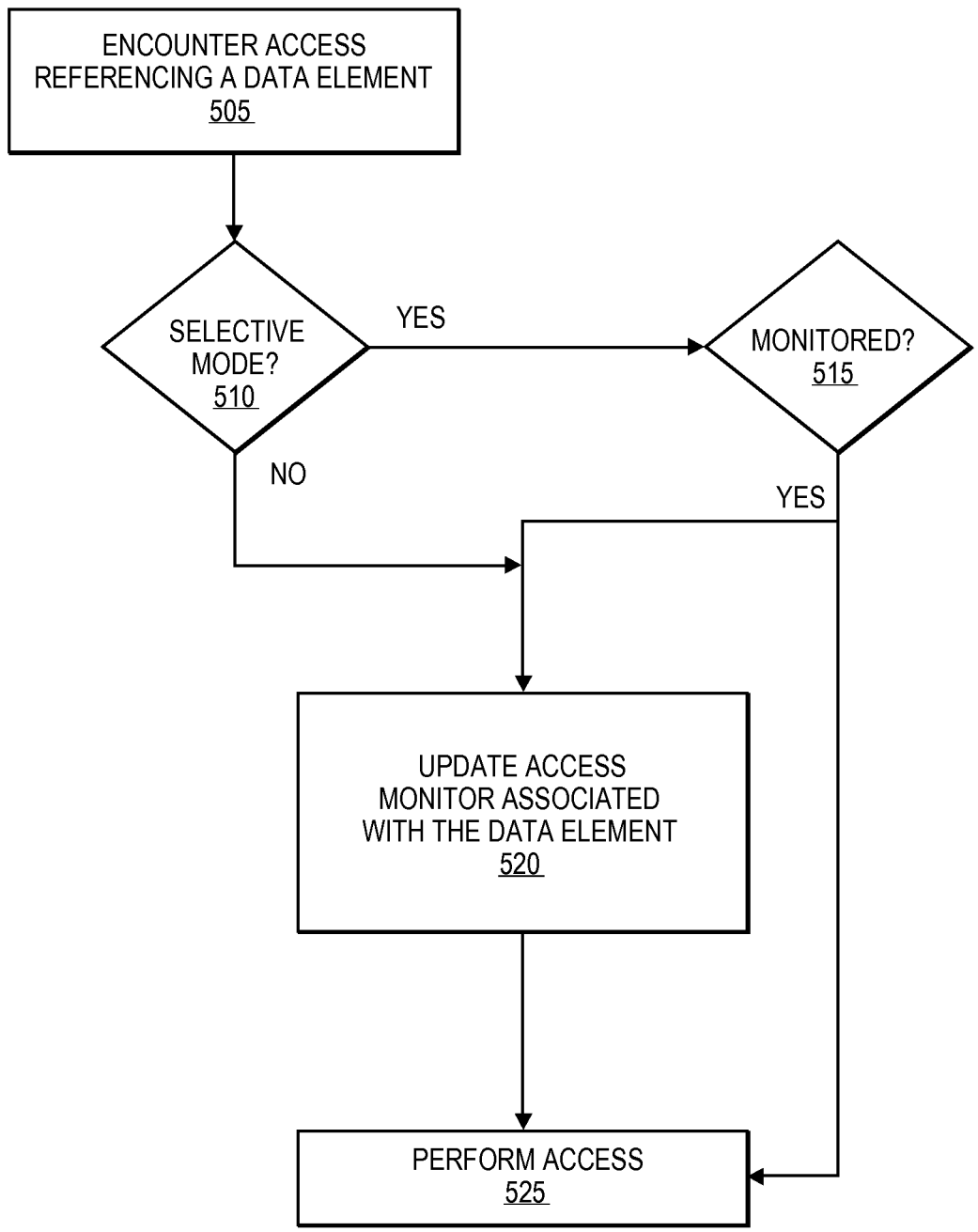
FIG. 5 illustrates an embodiment of a flow diagram for a method of monitoring memory accesses.

Referring next to FIG. 3, an embodiment of a flowchart for a method of monitoring in different modes is illustrated. Note the flowcharts of FIGS. 3 and 5 are illustrated in a substantially serial fashion. However, the methods illustrated by these Figures are not so limited, as they may occur in any order, as well as being performed at least partially in parallel.

In flow 305, it is determined if a memory access referencing a data element is to be monitored. In one embodiment, multiple modes of monitoring are provided, such as not monitoring, non-selective monitoring, and selective monitoring. As an example, software is capable of setting a monitoring mode. For example, a user instruction is capable of addressing a register, such as register 245 from FIG. 2, to indicate a mode of monitoring. Here, software determines which reads and writes are to be monitored. As an example, this determination may be made by software code, such as a compiler either statically or during runtime, application code, operating system code, hypervisor code, or a transactional runtime code.

During a selective mode of monitoring, in one embodiment, reads and writes are monitored, except for those that fall within specific criteria, which may be defined in any manner. A non-exhaustive exemplary list of selection criteria for memory accesses to memory addresses that may not be monitored include memory accesses to: virtual addresses falling within or outside a range or matching a mask, physical addresses falling within or outside a range or matching a mask, addresses belonging to specific memory types, address within a input/output (I/O) space, addresses executed in one protection domain on behalf of operations in another protection domain, address accessed by instructions identified by specific opcodes or prefixes, and specific data types, such as floating point or vector operations. In addition, monitoring attributes may be set in response to specific recognized instructions, such as only for explicitly transactional load and explicitly transactional store operations that are identified by the user and recognizable by hardware of processor 250.

Once it is determined if monitoring is to be applied in flow 350, then monitoring is either applied in flow 315 through updating of a monitor associated with the data element, or monitoring is not performed in flow 310 and the access is performed normally. Updating a monitor, such as attributes, associated with a data element includes any method of modifying the attributes to monitor the access appropriately, as discussed herein. An example of updating a monitor to different coherency states based on monitored and unmonitored read/writes is discussed below.

Figure 4:
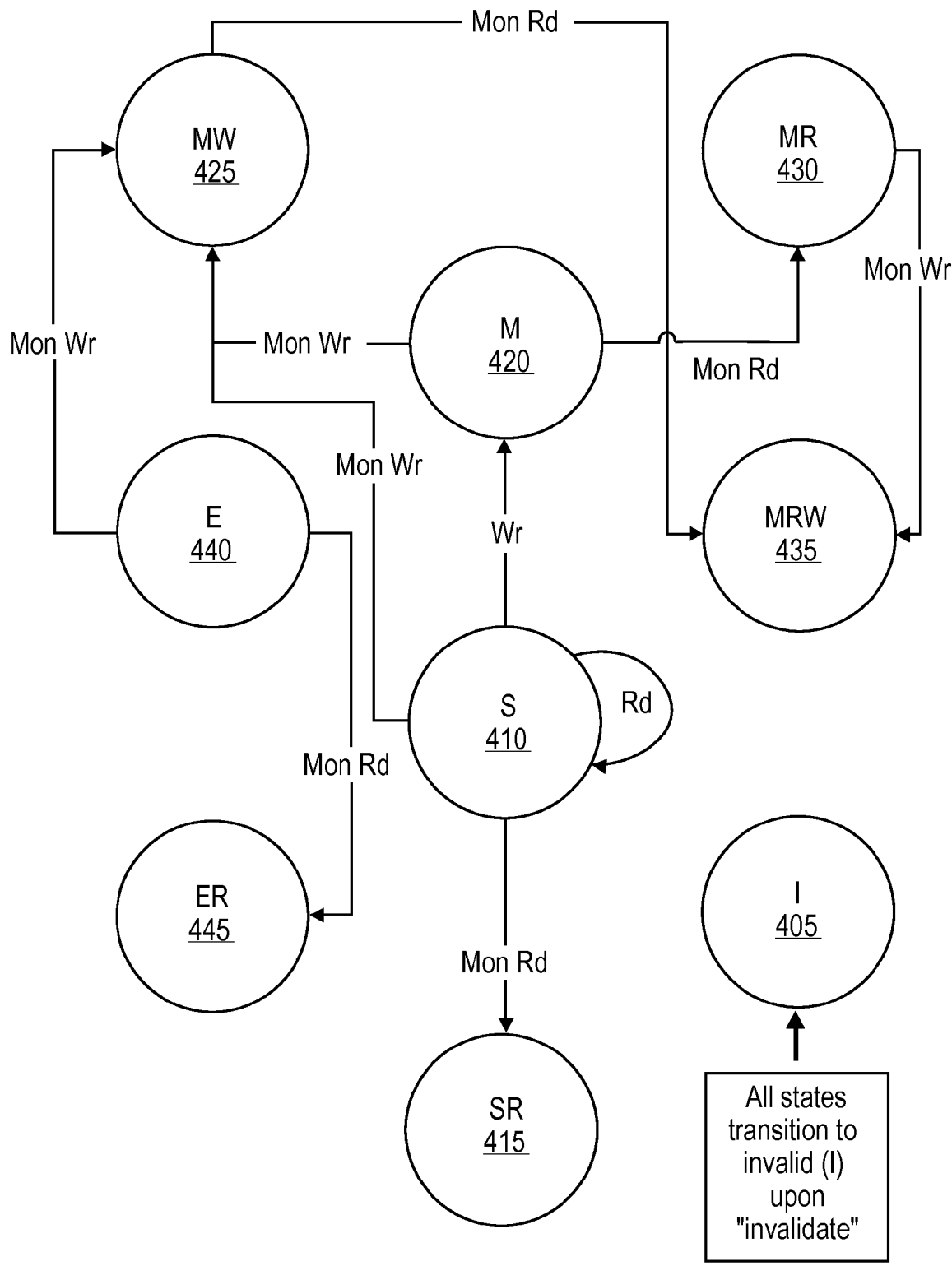
FIG. 4 illustrates another embodiment of a state transition diagram for cache coherency states including additional monitored cache coherency states.

Referring next to FIG. 4, an embodiment of a state transition diagram for a method of transitioning between coherency states, which include monitored coherency states, is depicted. Note that the state transition diagram in FIG. 4 is a partial state diagram, which does not illustrate some state transitions, such as clearing of monitoring attributes, to simplify the diagram. Furthermore, the states and transitions in between the states are purely illustrative. As an example, multiple step state transitions may occur between states instead of some of the direct transitions illustrated in FIG. 4.

A list of the depicted cache coherency states include: (1) a modified (M 420) state, i.e. the address was written and has no attribute associated with it; (2) a modified read (MR 430) state, i.e. the address was read and has the read attribute associated with it (e.g. when a previous read to the address and then the transaction writes an address); (3) a modified write (MW 425) state, i.e. the address was written and has the write attribute associated with it; (4) a modified read write (MRW 435) state, i.e. the address was read, then written, and has both Read and Write attributes associated with it; (5) an exclusive (E 440) state, i.e. the address was read and has no attribute associated with it; (6) an exclusive read (ER 445) state, i.e. the address was read and has the read attribute associated with it; (7) a shared (S 410), i.e. the address was read and has no attribute associated with it; (8) a shared read (SR 415) state, i.e. the address was read and has a Read attribute associated with it.

In one embodiment, these states may be implemented in accordance with an example of FIG. 2, where attributes are included within state bits of a cache thereby creating these new monitored coherency states. As an example, when a line(s) is held in a shared state 410 and a monitored read occurs referencing a memory address of a data item including the line(s), the coherency of the line(s) is transitioned to SR 415 state. As a result, in one embodiment, an external request to write the line(s) results in a potential conflict due to the coherency state being SR 415. Other potential conflicts may exists based on the coherency states in combination with other memory access request types, such as an external read request for a data item when a cache line including at least a portion of the data item is held in the MW coherency state 425.

Turning to FIG. 5, an embodiment of a flow diagram for performing a memory access is illustrated. In flow 505, a memory access referencing a memory address associated with a data item is encountered. Encountering a memory access includes any method of detecting a memory access at any stage of execution. Examples of different stages of encountering an operation include a decoder recognizing an opcode for a memory access, retrieving a memory access operation from an instruction cache, scheduling a memory access for execution on an execution unit, such as a load/store unit, and retiring a memory access.

In flow 510 it is determined if a processor is operating a selective mode of operation. As stated above, in one embodiment, software sets the mode of the processor. Here, software, when executing, updates a storage element, such as a register, to indicate the mode of operation. As an example, when execution of a transaction begins, software sets the mode to a non-selective, i.e. all memory accesses are monitored. When the transaction is finished the mode is toggled to selective monitoring or no monitoring. However, in another embodiment, hardware in the processor determines the mode of operation.

If the mode is determined to be selective, then in flow 515 it is determined if the specific memory access is to be monitored. Any number of selection criteria may be applied in this determination, such as whether or not the referenced memory address falls within a specified range of addresses or whether the data item is of a specific type. In addition, the criteria may simply include whether the memory access is identified by the software to be monitored, such as identified as an explicit transactional memory access. If the memory access is not to be monitored, then it is performed as normal in flow 525. However, if the memory access is to be monitored, then in flow 520 an access monitor(s) associated with the data item is updated accordingly. Here, the access may be performed in flow 525 before, during, or after the monitor is updated in flow 520.

Therefore, as can be seen from above, monitors, such as attributes, provide monitoring of memory accesses at a granularity of at least a data item/element without being limited by physical storage structure granularity. As a result, hardware attributes provide monitoring of accesses to memory address and associated data items within hardware, while maintaining the ability to monitor and detect conflicts at a software's data structure level. Furthermore, attributes also potentially operate as a filter for large transactions through supporting overflow into software when attribute information decays. Additionally, user mechanism, in one embodiment, are included to allow access to the attributes to perform direct operations on them.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
    determining if a memory access operation referencing a data item is to be monitored;
    caching the data item in a number of lines of a cache; and
    in response to determining the memory access operation is to be monitored,
        dynamically assigning the hardware attributes to be associated with the data item unaligned with the number of lines,
        updating the hardware attributes to represent an access state associated with a type of the memory access operation.

2. The method of claim 1, wherein determining if a memory access operation referencing a data item is to be monitored is based on an operating mode of a processor to execute the memory access operation.

3. The method of claim 1, wherein determining if a memory access operation referencing a data item is to be monitored is based on an identification by user-level software of the memory access operation as an operation to be monitored.

4. The method of claim 1, wherein the access state associated with the type of the memory access operation includes a monitored read state in response to the type of the memory access operation including a read type and a monitored write state in response to the type of the memory access operation including a write type.

5. The method of claim 1, further comprising:
    detecting a conflict in response to an external access request subsequent to execution of the memory access operation based on a type of the external access and the access state associated with a type of the memory access operation;
    reporting the conflict utilizing a status register in the processor to software in response to detecting the conflict; and
    executing a software handler to handle the conflict in response to reporting the conflict utilizing a status register in the processor to software.

6. A method comprising:
    determining if a memory access operation referencing a data item is to be monitored;
    caching the data item in a number of lines of a cache; and
    in response to determining the memory access operation is to be monitored,
        determining hardware attribute bits within coherency state entries associated with the number of lines, and
        updating the hardware attribute bits within coherency state entries associated with number of lines to represent a monitored coherency state associated with the type of the memory access operation.

7. The method of claim 6, wherein determining if a memory access operation referencing a data item is to be monitored is based on an operating mode of a processor to execute the memory access operation.

8. The method of claim 6, wherein determining if a memory access operation referencing a data item is to be monitored is based on an identification by user-level software of the memory access operation as an operation to be monitored.

9. The method of claim 6, wherein the access state associated with the type of the memory access operation includes a monitored read state in response to the type of the memory access operation including a read type and a monitored write state in response to the type of the memory access operation including a write type.

10. The method of claim 6, further comprising:
    detecting a conflict in response to an external access request subsequent to execution of the memory access operation based on a type of the external access and the access state associated with a type of the memory access operation;
    reporting the conflict utilizing a status register in the processor to software in response to detecting the conflict; and
    executing a software handler to handle the conflict in response to reporting the conflict utilizing a status register in the processor to software.

11. An apparatus comprising:
    execution logic configured to execute a transactional memory access operation to reference a memory address to be associated with a data item;
    a memory coupled to the processing logic, the memory configured to hold the data item unaligned with boundaries of a plurality of lines of the memory in response to the execution logic executing the transactional memory access operation; and
    a plurality of read monitors and a plurality of write monitors corresponding to the plurality of memory lines of the memory the plurality of read monitors and write monitors configured to perform bounded access monitoring of the data item despite a granularity of the memory in response to the execution logic executing the transactional memory access operation.

12. The apparatus of claim 11, wherein the plurality of read monitors and the plurality of write monitors are to be readable and modifiable in response to the execution logic executing user-level instructions.

13. The apparatus of claim 11, wherein the memory includes a data cache.

14. The apparatus of claim 13, wherein the transactional memory access operation includes a transactional load, and wherein the hardware monitors associated with the data cache to perform bounded access monitoring of the data item despite a granularity of the memory in response to the execution logic executing the transactional load comprises a number of read monitors of the plurality of read monitors, which correspond to the number of cache lines of the plurality of cache lines holding at least a portion of the data item, to be updated to a monitored read state in response to the execution logic executing the transactional load.

15. The apparatus of claim 14, wherein the transactional memory access operation includes a transactional store, and wherein the hardware monitors associated with the data cache to perform bounded access monitoring of the data item despite a granularity of the memory in response to the execution logic executing the transactional store comprises a number of write monitors of the plurality of write monitors, which correspond to the number of cache lines of the plurality of cache lines holding at least a portion of the data item, to be updated to a monitored write state in response to the execution logic executing the transactional write.

16. The apparatus of claim 15, wherein control logic is to detect a transactional conflict in response to the control logic detecting an external write request to a cache line of the number of cache lines when a read monitor of the number of read monitors corresponding to the cache line is updated to the monitored read state.

17. The apparatus of claim 15, wherein the control logic is to detect a transactional conflict in response to the control logic detecting an external read request from a cache line of the number of cache lines when a write monitor of the number of write monitors corresponding to the cache line is updated to the monitored write state.

18. The apparatus of claim 15, wherein the number of read monitors and the number of write monitors are to be reset to an unmonitored state in response to the execution logic executing a user-level clear operation.

19. The apparatus of claim 15, wherein the number includes an integer greater than one.

20. The apparatus of claim 11, wherein the plurality of read monitors and the plurality of write monitors are to be associated with the memory dynamically based on a size of the data item.

21. The apparatus of claim 20, wherein the the plurality of read monitors and the plurality of write monitors are to be associated with the memory dynamically based on a size of the data item comprises logic to dynamically assign a read monitor and a write monitor from a pool of the plurlaity of read monitors and the plurliaty of write monitors to a plurality of lines of the memory, which are to hold at least a portion of the data item, responsive to the size of the data item being greater than a line of the memory and the execution logic executing the transactional memory access operation.

22. The apparatus of claim 21, wherein the plurality of read monitors and the plurality of write monitors associated with the memory to perform bounded access monitoring of the data item despite a granularity of the memory in response to the execution logic executing the transactional memory access operation comprises the read monitor assigned to the plurality of lines being set to a read monitored state in response to the execution logic executing the a transactional load operation and the write monitor assigned to the plurality of liens being set to a write monitored state in response to the execution logic executing a transactional store operation.

23. An apparatus comprising:
 execution logic configured to execute a transactional memory access operation to reference a memory address to be associated with a data item;
 a memory coupled to the processing logic, the memory configured to hold the data item in response to the execution logic executing the transactional memory access operation; and
 a plurality of read monitors and a plurality of write monitors to be associated with the memory dynamically based on a size of the data item, the plurality of read monitors and write monitors configured to perform bounded access monitoring of the data item despite a granularity of the memory in response to the execution logic executing the transactional memory access operation.

24. The apparatus of claim 23, wherein the the plurality of read monitors and the plurality of write monitors are to be associated with the memory dynamically based on a size of the data item comprises logic to dynamically assign a read monitor and a write monitor from a pool of the plurlaity of read monitors and the plurliaty of write monitors to a plurality of lines of the memory, which are to hold at least a portion of the data item, responsive to the size of the data item being greater than a line of the memory and the execution logic executing the transactional memory access operation.

25. The apparatus of claim 24, wherein the plurality of read monitors and the plurality of write monitors associated with the memory to perform bounded access monitoring of the data item despite a granularity of the memory in response to the execution logic executing the transactional memory access operation comprises the read monitor assigned to the plurality of lines being set to a read monitored state in response to the execution logic executing the a transactional load operation and the write monitor assigned to the plurality of liens being set to a write monitored state in response to the execution logic executing a transactional store operation.

\* \* \* \* \*

UNITED STATES PATENT AND TRADEMARK OFFICE
CERTIFICATE OF CORRECTION

PATENT NO. : 8,627,017 B2
APPLICATION NO. : 12/346530
DATED : January 7, 2014
INVENTOR(S) : Sheaffer et al.

Page 1 of 1

It is certified that error appears in the above-identified patent and that said Letters Patent is hereby corrected as shown below:

In the Claims

Column 20, line 32, Claim 24 delete, ""plurlaity"" and insert --plurality--.

Column 20, line 33, Claim 24 delete, ""plurliaty"" and insert --plurality--.

Signed and Sealed this
Eleventh Day of November, 2014

Michelle K. Lee
*Deputy Director of the United States Patent and Trademark Office*